US009616895B2

(12) United States Patent
Nefcy et al.

(10) Patent No.: US 9,616,895 B2
(45) Date of Patent: Apr. 11, 2017

(54) CONTROLLED REGENERATIVE BRAKING TORQUE INCREMENTING IN HYBRID VEHICLE DOWNSHIFT

(75) Inventors: Bernard D. Nefcy, Novi, MI (US); Daniel Scott Colvin, Farmington Hills, MI (US); Walter Joseph Ortmann, Saline, MI (US); Marvin Paul Kraska, Dearborn, MI (US); Mark Steven Yamazaki, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 1124 days.

(21) Appl. No.: 13/465,267

(22) Filed: May 7, 2012

(65) Prior Publication Data

US 2013/0296100 A1    Nov. 7, 2013

(51) Int. Cl.
| | | |
|---|---|---|
| *B60T 13/58* | (2006.01) | |
| *B60L 7/10* | (2006.01) | |
| *B60L 7/20* | (2006.01) | |
| *B60W 10/08* | (2006.01) | |
| *B60W 10/11* | (2012.01) | |
| *B60W 20/00* | (2006.01) | |
| *B60W 30/18* | (2012.01) | |
| *B60W 30/19* | (2012.01) | |
| *B60W 20/14* | (2016.01) | |

(Continued)

(52) U.S. Cl.
CPC ......... *B60W 30/18127* (2013.01); *B60L 7/10* (2013.01); *B60L 7/20* (2013.01); *B60T 13/586* (2013.01); *B60W 10/08* (2013.01); *B60W 10/11* (2013.01); *B60W 20/14* (2016.01); *B60W 30/19* (2013.01); *B60W 2710/1016* (2013.01);

(Continued)

(58) Field of Classification Search
CPC . B60T 13/586; B60L 7/10; B60L 7/20; B60L 7/22; F16H 61/06; F16H 61/061; F16H 61/688; F16H 2061/0422; F16H 2061/0496; B60W 10/08; B60W 20/1062; B60W 30/18127; B60W 30/18136; B60W 2510/1015; B60W 2510/1035; B60W 2510/1011; B60W 10/11; B60W 30/19; B60W 2710/1016; B60W 20/14; Y10T 477/24; Y10T 477/26; Y10T 477/27; Y10T 477/677; Y10T 477/679; Y10T 477/69373;

(Continued)

(56) References Cited

U.S. PATENT DOCUMENTS 5,839,800 A  *  11/1998  Koga et al. ................... 303/152
6,126,251 A  *  10/2000  Yoshii et al. ................. 303/152

(Continued)

FOREIGN PATENT DOCUMENTS

JP          3799866 B2       7/2006
WO     WO 2011122533 A1  *  10/2011

OTHER PUBLICATIONS

Chinese Patent Office, First Office Action for the corresponding Chinese Patent Application No. 201310165108.1 dated Jun. 2, 2016.

*Primary Examiner* — Terry Chau
(74) *Attorney, Agent, or Firm* — David B. Kelley; Brooks Kushman P.C.

(57) ABSTRACT

A controller and control strategies minimize shift shock in a hybrid electric vehicle during a downshift during regenerative braking by maintaining the transmission input speed substantially linear when the transmission input speed is slowing. The controller and the control strategies control the regenerative braking torque during a downshift occurring during regenerative braking in such a way that the transmission input speed is maintained substantially linear when the transmission input speed is slowing during a torque phase of the downshift.

9 Claims, 2 Drawing Sheets

(52) U.S. Cl.
CPC ... *B60Y 2300/18125* (2013.01); *Y10T 477/24* (2015.01); *Y10T 477/26* (2015.01); *Y10T 477/647* (2015.01)

(58) Field of Classification Search
CPC .......... Y10T 477/6938; Y10T 477/647; B60Y 2300/18125
USPC .................................................. 303/151, 152
See application file for complete search history.

(56) References Cited

U.S. PATENT DOCUMENTS

| | | | |
|---|---|---|---|
| 6,832,978 B2 | 12/2004 | Buchanan et al. | |
| 7,025,707 B2* | 4/2006 | Katakura | 477/123 |
| 7,510,506 B2* | 3/2009 | Kupper et al. | 477/180 |
| 7,666,113 B2* | 2/2010 | Honma et al. | 475/132 |
| 8,864,624 B2* | 10/2014 | Hoffmeister et al. | 477/70 |
| 2003/0019313 A1* | 1/2003 | Ibamoto et al. | 74/339 |
| 2003/0069103 A1* | 4/2003 | Ibamoto et al. | 475/5 |
| 2006/0011394 A1 | 1/2006 | Colvin et al. | |
| 2009/0118957 A1 | 5/2009 | Heap et al. | |
| 2009/0248256 A1* | 10/2009 | Nishijima et al. | 701/49 |
| 2010/0023230 A1 | 1/2010 | Holmes | |
| 2010/0173745 A1* | 7/2010 | Hase et al. | 477/5 |
| 2010/0261577 A1 | 10/2010 | MacFarlane et al. | |
| 2011/0246009 A1* | 10/2011 | Hase et al. | 701/22 |
| 2012/0101697 A1* | 4/2012 | Hawkins et al. | 701/51 |
| 2012/0234133 A1* | 9/2012 | Ikegami et al. | 74/661 |
| 2012/0265382 A1* | 10/2012 | Nefcy et al. | 701/22 |
| 2012/0290163 A1* | 11/2012 | Inagaki et al. | 701/22 |

* cited by examiner

CONTROLLED REGENERATIVE BRAKING TORQUE INCREMENTING IN HYBRID VEHICLE DOWNSHIFT

TECHNICAL FIELD

The present invention relates to controlling regenerative braking torque in a hybrid vehicle powertrain during a ratio change of the transmission that occurs during regenerative braking.

BACKGROUND

A hybrid vehicle powertrain includes an electric machine such as an electric motor, wherein torque produced by an engine is supplemented with torque produced by the motor. The combined engine and motor torques are transferred to vehicle drive wheels through a transmission.

In a modular hybrid transmission ("MHT") configuration, the engine is connectable to and dis-connectable from the motor by a disconnect clutch with the motor configured to directly drive the input shaft of the transmission. The engine, the disconnect clutch, the motor, and the transmission are connected sequentially in series when the engine is connected to the motor by the disconnect clutch.

During a process referred to as regenerative braking in a hybrid powertrain, charging a high-voltage battery during vehicle braking collects the potential and kinetic energy stored in the braking vehicle. During regenerative braking, required wheel braking torque is allocated between friction brakes and the motor, which acts as a generator. The amount of wheel braking torque required as the vehicle brakes is apportioned in real time by a controller between the hydraulic, mechanical friction braking hardware and the electric powertrain regenerative braking. The apportionment of wheel braking torque between friction braking torque and regenerative braking torque (i.e., negative input torque via the motor) is balanced through the braking process to achieve as much regeneration as possible to thereby improve fuel economy.

SUMMARY

Embodiments of the present invention are directed to a controller and control strategies which minimize shift shock in a hybrid electric vehicle during a downshift during regenerative braking by maintaining the transmission input speed substantially linear when the transmission input speed is slowing. The controller and the control strategies control the regenerative braking torque during a downshift occurring during regenerative braking in such a way that the transmission input speed is maintained substantially linear when the transmission input speed is slowing during a torque phase of the downshift.

In an embodiment, a system having a transmission and a controller is provided. The transmission includes multiple gear ratios for driving a drive wheel. The controller is configured to effect a downshift between gear ratios during regenerative braking while maintaining the transmission input speed substantially linear when the transmission input speed is slowing.

The system may further include a motor configured to supply a regenerative braking torque to the transmission. The controller may limit the regenerative braking torque to counteract variations, which tend to be caused by regenerative braking, in the transmission input speed when the transmission input speed is slowing. The controller may limit the regenerative braking torque during a torque phase of the downshift to counteract the variations. For instance, the controller may limit the regenerative braking torque by slowly increasing the regenerative braking torque over time in lieu of immediately increasing the regenerative braking torque.

The system may further include a friction brake system configured to supply a friction braking torque to the drive wheel. The controller may vary the friction braking torque according to the regenerative braking torque such that the summation of the friction braking torque and the regenerative braking torque corresponds to a required wheel braking torque. For instance, the controller may slowly decrease the friction braking torque as the regenerative braking torque is slowly increased such that the summation of the friction braking torque and the regenerative braking torque is maintained constant.

In an embodiment, a method for a hybrid vehicle powertrain system including a transmission for driving a drive wheel through multiple gear ratios is provided. In the method, a downshift between the gear ratios during regenerative braking is effected. A transmission input speed signal indicative of the transmission input speed is measured. The transmission input speed signal is maintained substantially linear while the transmission input speed is slowing during the downshift.

In an embodiment, a method in a hybrid vehicle powertrain system including an automatic transmission with multiple gear ratios includes effecting a downshift between the gear ratios during regenerative braking and maintaining the transmission input speed substantially linear while the transmission input speed is slowing during the downshift.

Additional objects, features, and advantages of embodiments of the present invention will become more readily apparent from the following detailed description when taken in conjunction with the drawings, wherein like reference numerals refer to corresponding parts.

DETAILED DESCRIPTION

Detailed embodiments of the present invention are disclosed herein; however, it is to be understood that the disclosed embodiments are merely exemplary of the present invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
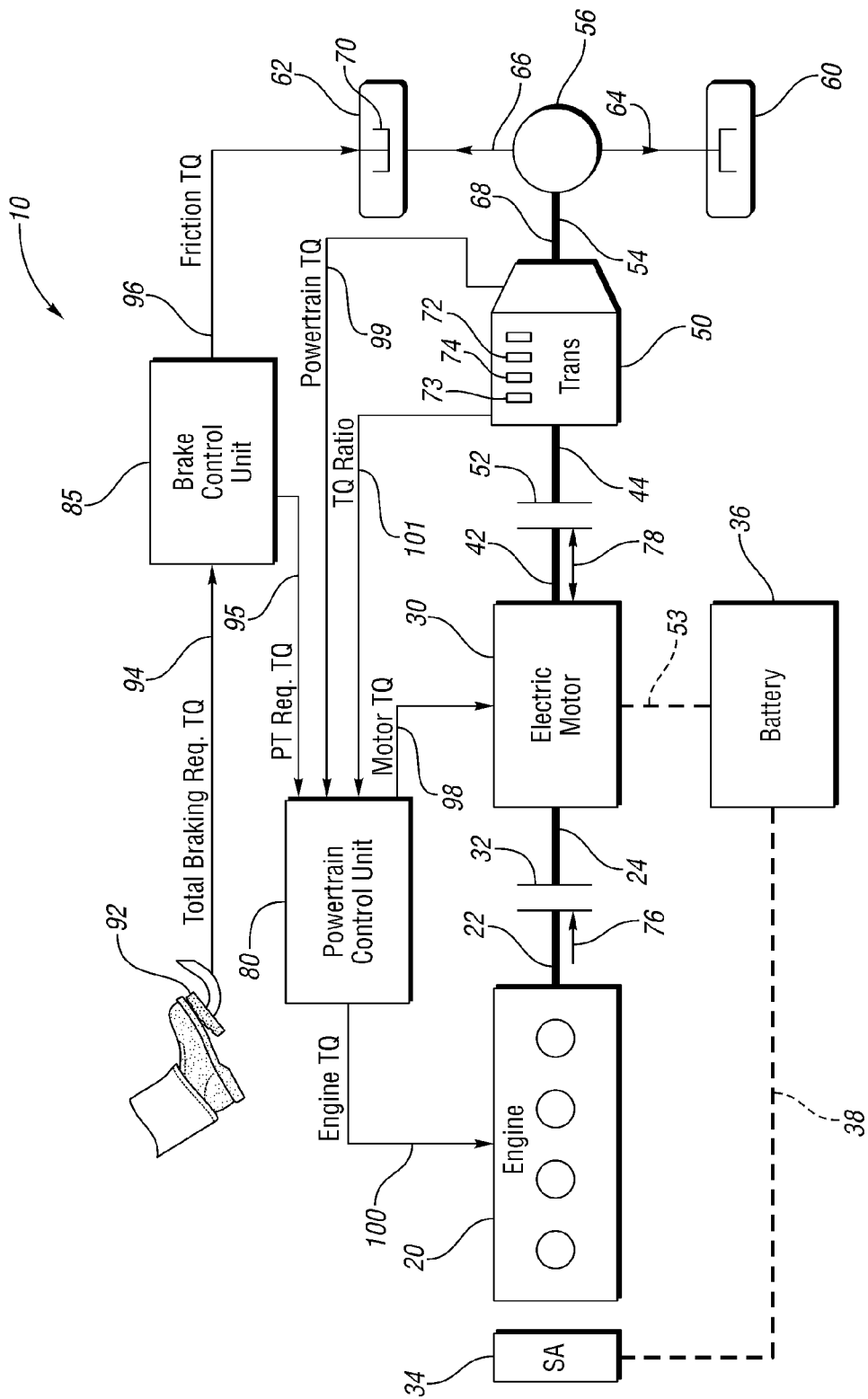
FIG. 1 illustrates a block diagram of an exemplary hybrid vehicle powertrain in accordance with an embodiment of the present invention.

Referring now to FIG. 1, a block diagram of an exemplary powertrain system 10 for a hybrid electric vehicle in accordance with an embodiment of the present invention is shown. Powertrain system 10 includes an engine 20, an electric machine such as an electric motor/generator 30 ("motor"), a multiple-ratio automatic transmission 50, and a friction braking system.

Engine 20 has an output shaft 22 connectable to and dis-connectable from an input shaft 24 of motor 30 through an engine clutch 32 (i.e., a disconnect clutch 32). Motor 30 has an output shaft 42 connectable to and dis-connectable from an input shaft 44 of transmission 50 through a motor clutch 52 (i.e., a launch clutch 52). Although clutches 32, 52 are described and illustrated as hydraulic clutches, other types of clutches such as electro-mechanical clutches may be used.

Transmission 50 includes multiple gear ratios and is connected to a drive shaft 54 (i.e., an output shaft of transmission 50). Output shaft 54 is connected to a differential 56. Left and right drive wheels 60, 62 are connected to differential 56 through left and right axles 64, 66. With this arrangement, transmission 50 transmits a powertrain output torque 68 to drive wheels 60, 62. Wheels 60, 62 are provided with friction brakes 70 for applying a braking force to slow the vehicle.

Engine 20 may be connected to a starter motor 34 used to start engine 20. Starter motor 34 is connected to a traction battery 36 through wiring 38 so as to be also used as a generator to produce electric energy for storage in battery 36. When running, engine 20 can provide power to starter motor 34 so that starter motor 34 generates electric energy for storage in battery 36. Motor 30 is also linked to battery 36 through wiring 53.

Engine 20 is a primary source of power for powertrain system 10 and battery 36 is a secondary source of power for powertrain system 10. Engine 20 is an internal combustion engine such as a gasoline, diesel, or natural gas powered engine. Engine 20 generates a first input torque 76 (i.e., an engine torque) that is supplied to motor 30 when engine 20 and motor 30 are connected via engine clutch 32. To drive the vehicle with engine 20, at least a portion of first input torque 76 passes from engine 20 through engine clutch 32 to motor 30 and then from motor 30 through motor clutch 52 to transmission 50. Engine 20 also provides power through engine clutch 32 to motor 30 so that motor 30 can act as a generator and produce electric energy for storage in battery 36.

Depending on the particular operating mode of the vehicle as will be detailed further below, motor 30 either sends power to battery 36 or converts electric energy stored in battery 36 into a second input torque 78 (i.e., a motor torque). Second input torque 78 is also sent to transmission 50 through motor clutch 52. When generating electrical power for storage in battery 36, motor 30 obtains power either from engine 20 in a driving mode or from the inertial mass of the vehicle as motor 30 acts as a brake in what is referred to as a regenerative braking mode.

As described, engine 20, engine clutch 32, motor 30, motor clutch 52, and transmission 50 are connectable sequentially in series as illustrated in FIG. 1. As such, powertrain system 10 represents a modular hybrid transmission ("MHT") configuration in which engine 20 is connected to motor 30 by engine clutch 32 with motor 30 being connected to transmission input shaft 44 by motor clutch 52.

Depending on whether engine clutch 32 and motor clutch 52 are engaged or disengaged determines which input torques 76 and 78 are transferred to transmission 50. For example, if engine clutch 32 is disengaged, then only second input torque 78 from motor 30 is supplied to transmission 50. If both clutches 32, 52 are engaged, then both first and second input torques 76, 78 from engine 20 and motor 30, respectively, are supplied to transmission 50. Of course, if input torque for transmission 50 is only desired from engine 20, both clutches 32 and 52 are engaged, but motor 30 is not energized, such that first input torque 76 from engine 20 is only supplied to transmission 50.

Transmission 50 includes several planetary gear sets (not shown) that are selectively placed in different gear ratios by selective engagement of a plurality of friction elements in order to establish the desired multiple drive ratios. For instance, the friction elements of transmission 50 can be constituted by an on-coming friction element 72 (i.e., an on-coming clutch ("OCC")), an off-going friction element 73 (i.e., an off-going clutch ("OGC")), and a forward clutch 74. The friction elements of transmission 50 are controllable through a shift schedule that connects and disconnects certain elements of the planetary gear sets of transmission 50 to control the ratio between the transmission output and the transmission input.

Transmission 50 is automatically shifted from one ratio to another based on the needs of the vehicle. Transmission 50 then provides powertrain output torque 68 to output shaft 54. Powertrain output torque 68 ultimately drives drive wheels 60, 62. The kinetic details of transmission 50 can be established by a wide range of transmission arrangements. Transmission 50 is an example of a transmission arrangement for use with embodiments of the present invention. Any multiple ratio transmission that accepts input torque(s) from an engine and/or a motor and then provides torque to an output shaft at the different ratios is acceptable for use with embodiments of the present invention.

Powertrain system 10 further includes a powertrain control unit 80 and a brake control unit 85. Control units 80 and 85 collectively constitute a vehicle system controller. Based on repositioning a brake pedal 92, the driver of the vehicle provides a total braking torque requirement signal 94 when the driver wants to slow the vehicle. The more the driver depresses pedal 92, the more wheel braking torque is requested. Brake control unit 85 apportions the total wheel braking torque between (i) a powertrain braking torque signal 95 (which represents the amount of torque to be obtained by regenerative braking) and (ii) a friction braking torque signal 96 (which represents the amount of torque to be obtained through friction brakes 70).

Brake control unit 85 provides friction braking torque signal 96 to friction brakes 70 for the friction brakes to apply the friction braking torque to the drive wheels. Brake control unit 85 provides powertrain braking torque signal 95 to powertrain control unit 80. In response, powertrain control unit 80 sends a motor torque signal 98 to motor 30 representing the requisite amount of motor torque to be provided by regenerative braking. In turn, motor 30 generates the regenerative braking torque and thereby supplies a negative input torque to transmission 50.

Powertrain control unit 80 receives torque ratio signals 101 from a transmission control unit (not shown) associated with transmission 50 regarding shifting from one speed ratio to another, such as during a gear shift. Powertrain control unit 80 also receives a powertrain torque signal 99 representing an amount of total powertrain torque 68 from a control unit (not shown) which calculates total powertrain torque 68. Powertrain control unit 80 sends an engine torque signal 100 to engine 20 indicating how much engine torque is required at a given time.

Transmission 50 has an input torque limit for each gear. Transmission 50 protects itself by publishing its input torque limit to the vehicle system controller. This insures that the controller accordingly controls engine 20 and motor 30 such that the input torque limit of transmission 50 is not exceeded by the combined engine and motor torques.

As described above, the driver depresses brake pedal 92 to brake the vehicle. A regenerative braking event begins when brake pedal 92 is depressed. During the regenerative braking event, motor 30 provides the input torque to transmission 50. In this case, the input torque is a regenerative braking torque (i.e., a negative input torque via the motor which acts as a generator whereby battery 36 is charged with collected potential and kinetic energy stored in the braking vehicle). Transmission 50 uses the motor torque to provide at least part of the wheel braking torque. (The other component of the wheel braking torque is the friction braking torque as described above.)

A downshift of transmission 50 is typically requested when collecting regenerative braking energy as the higher input speed of transmission 50 allows for greater regenerative braking power, usually at higher efficiencies. The standard shift schedule is typically modified during a regenerative braking event to downshift sooner so that more power can be collected at a better efficiency. The input speed of transmission 50 is pushed higher when transmission 50 downshifts because of the speed ratio increase.

During a downshift the pressure of OGC 73 is calculated based on the input torque. The driver can instantly increase or decrease the desired wheel braking by depressing brake pedal 92 differently and therefore the input torque can instantly increase or decrease in response. If either the regenerative braking event has not progressed to the maximum available input torque (e.g., the maximum negative regenerative braking torque) or the driver desires more braking, then the change in the desired input torque relative to the actual input torque (i.e., the desired input torque versus the negative regenerative braking torque) may be too fast for OGC 73 to hold before OCC 72 is engaged. This results in the transmission input speed dipping too low or even stopping.

Control strategies in accordance with embodiments of the present invention limit the actual input torque (i.e., the negative regenerative braking torque) from changing too quickly once a downshift has been initiated. For instance, the torque limit of transmission 50 may be employed to limit the input torque from changing too quickly once a downshift has been initiated. As described above, transmission 50 has an input torque limit which is the amount of input torque that transmission 50 is capable to transmit at steady state. Setting the input torque limit to the current input torque level ensures that the calculated pressure of OGC 73 can hold the input torque as OGC 73 waits for OCC 72 to engage. This is meaningful during this time if either the desired wheel braking torque increases or the regenerative braking torque is not at its final value. After initially limiting the input torque, the input torque limit can be removed at a rate at which OGC 73 can respond, thus increasing the regenerative braking energy captured. This effectively keeps the transmission input speed at appropriate levels; reducing perceived drivability and possible clutch wear issues.

Figure 2A:
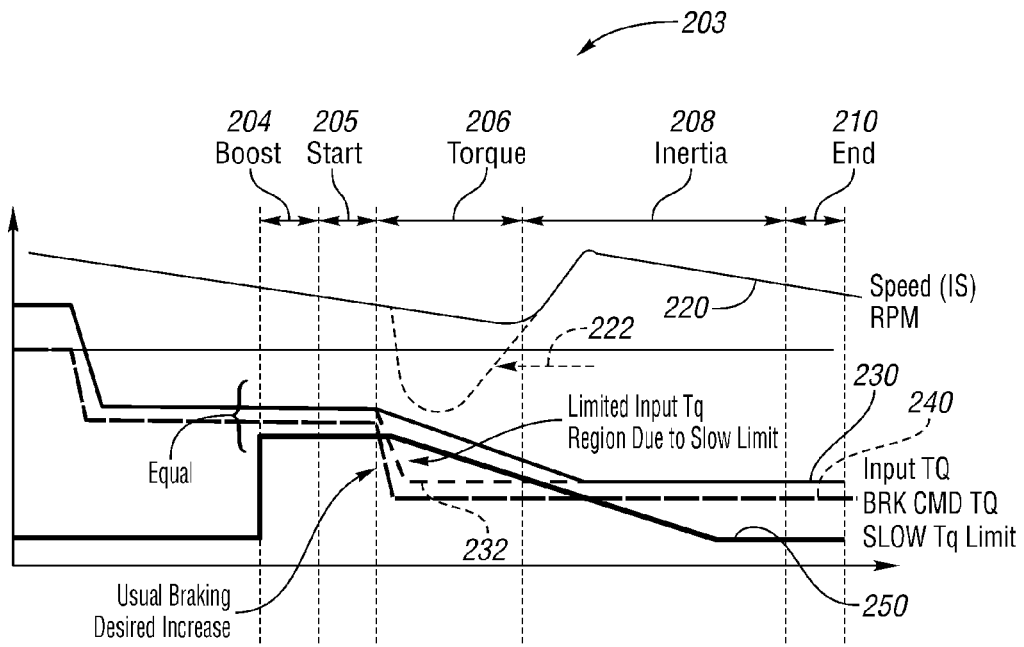
FIGS. 2A and 2B illustrate graphs of a downshift event in the powertrain of FIG. 1 from a high gear configuration to a low gear configuration with transmission input speed dipping effects compensated for by limiting regenerative braking torque from the electric motor.
Figure 2B:
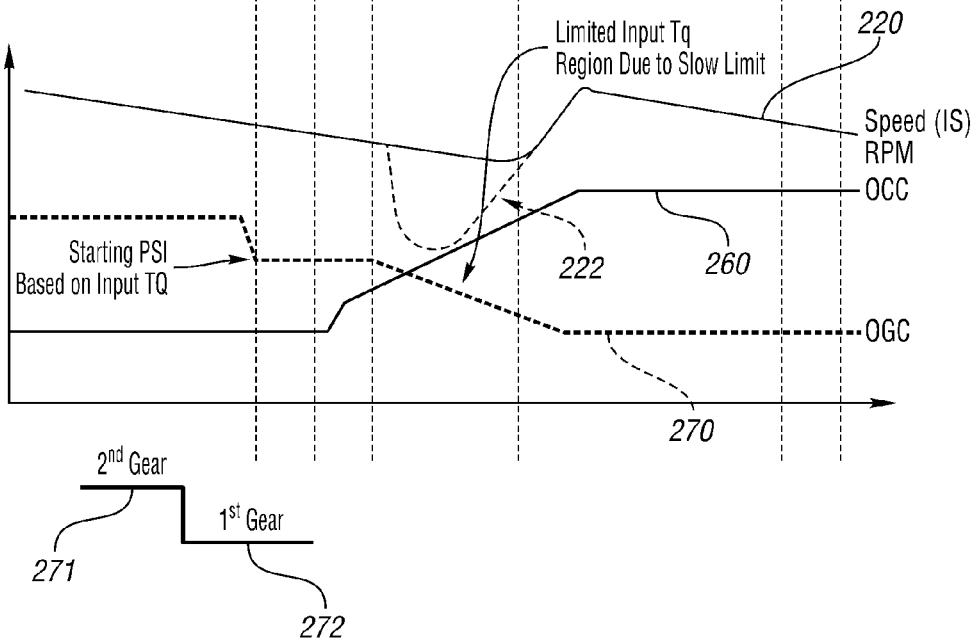

Turning now to FIGS. 2A and 2B, there is shown an embodiment setting forth a control strategy for preventing the input torque from changing too quickly during a downshift event occurring during regenerative braking. In particular, the regenerative braking torque is limited (e.g., slowly increased over time) to thereby prevent transmission input speed dipping effects. In each of FIGS. 2A and 2B, an exemplary downshift from a $2^{nd}$ gear to a $1^{st}$ gear is presented, with the X-axis representing time and the Y-axis representing either transmission input speed, actual input torque, driver commanded input torque (e.g., total braking required torque (BRK CMD TQ)), input torque limit, or clutch pressure depending on the particular curve of interest.

With reference to FIGS. 2A and 2B, a downshift 203 is shown having five basic phases. A first or boost phase 204 is where OCC 72 is boosted to fill its friction element actuator quickly while OGC 73 has its pressure set to a value just sufficient to hold input torque. In a second or start phase 205, OGC 73 continues to hold transmission 50 in its current gear ratio while OCC 72 is still stroking. In a third or torque phase 206, OGC 73 begins releasing, reducing its torque capacity, and OCC 72 continues increasing its torque capacity. This results in the input torque transferring from OGC 73 to OCC 72. In fourth or inertia phase 208, OCC 72 continues to control the transmission input speed up to the new speed ratio. In a fifth or end phase 210, the downshift is completed.

FIG. 2A further shows a plot of the speed of transmission input speed 220 (i.e., the speed of transmission input shaft 44 in RPM), regenerative braking torque 230 (i.e., the actual negative motor torque), driver commanded input torque 240, and transmission torque limit 250, which are all plotted as a function of time during the shift. FIG. 2B further shows a plot of transmission input speed 220, the pressure (psi) 260 of OCC 72, and the pressure (psi) 270 of OGC 73.

As described above, the regenerative braking event initiates when the driver depresses brake pedal 92. During the regenerative braking event, the controller apportions the overall wheel braking torque between (i) the friction braking torque provided by friction brakes 70 and (ii) the regenerative braking torque (i.e., negative input torque) provided via motor 30, which acts as a generator. Thus, during the regenerative braking event, motor 30 provides the input torque which is in the form of a negative input torque.

With reference to FIGS. 1 and 2A, at the initiation of the regenerative braking event, the controller generates a motor torque signal 98 indicative of driver commanded input torque 240 to be provided by regenerative braking. The controller sends motor torque signal 98 to motor 30. In turn, motor 30 provides the regenerative braking torque to transmission 50. As shown in FIG. 2A, the magnitude of the regenerative braking torque from motor 30 is increased until the regenerative braking torque is equal to the driver commanded input torque. The magnitude of the regenerative braking torque is then held constant in accordance with the driver commanded input torque as the regenerative braking event proceeds towards downshift event 203. Notably, the magnitude of the regenerative braking torque could be increased in accordance with an increased driver commanded input torque as the magnitude of transmission torque limit 250 is relatively larger than regenerative braking torque 230 prior to downshift event 203 as shown in FIG. 2A.

The controller also generates friction braking torque signal 96 indicative of the amount of torque to be obtained through friction brakes 70. As noted, the wheel braking torque corresponds to the summation of the friction braking torque and the regenerative braking torque.

During the entire regenerative braking event, the friction braking torque can be controlled accordingly such that the desired wheel braking torque is obtained at all times. For instance, both the friction braking torque and the regenerative braking torque can be increased to meet an increase in the desired wheel braking torque. This is what occurs at the initiation of the regenerative braking event.

As another example, the friction braking torque can be increased in lieu of increasing the regenerative braking torque to meet an increase in the desired wheel braking torque. The regenerative braking torque can then be increased slowly over time with the friction braking torque correspondingly decreasing slowly over time such that the wheel braking torque remains constant per the increased desired wheel braking. As explained below, this may occur during torque phase 206 pursuant to control strategies in accordance with embodiments of the present invention. Thus, according to the control strategies, in response to the driver instantly increasing the desired braking by further depressing brake pedal 92, the friction braking torque in lieu of the regenerative braking torque is increased to immediately meet the increase in the desired wheel braking torque. Subsequently, the regenerative braking torque is increased slowly to an increased value at which the regenerative braking torque accommodates the increase in the desired braking. As the regenerative braking torque is increased, the friction braking torque is correspondingly decreased such that the wheel braking torque matches the desired wheel braking.

In another scenario pursuant to control strategies in accordance with embodiments of the present invention, the regenerative braking torque is increased slowly over time as the regenerative braking event progresses with the friction braking torque correspondingly decreasing slowly over time such that the wheel braking torque remains constant per constant desired braking. In this case, there may not be any further increase in the braking desired by the driver. As explained below, this case may also occur during torque phase 206 pursuant to control strategies in accordance with embodiments of the present invention.

After the initiation of the regenerative braking event, downshift event 203 then begins with boost phase 204 followed by start phase 205. In both boost phase 204 and start phase 205, the regenerative braking torque 230 remains constant as the driver commanded input torque 240 remains constant. However, the controller reduces the input torque limit of transmission 50 to have a lower magnitude. As a result, the magnitude of transmission torque limit 250 is lower in both phases 204, 205 than prior to boost phase 204 as shown in FIG. 2A. In particular, the input torque limit is decreased (in magnitude) such that the regenerative braking torque cannot be increased (in magnitude) without violating the input torque limit. That is, the input torque limit is decreased such that regenerative braking torque 230 cannot cross over transmission torque limit 250 without violating the input torque limit. Consequently, the regenerative braking torque is not increased further regardless of whether there is an increase in the magnitude of the driver commanded input torque. In this case, during phases 204, 205, the driver commanded input torque is constant such that the regenerative braking torque remains constant and lower than the input torque limit established by the transmission torque limit 250. Any increase in the wheel braking torque during this time would be accommodated by a corresponding increase in the friction braking torque.

Downshift 203 then proceeds to torque phase 206. Torque phase 206 begins with the controller increasing the magnitude of the driver commanded input torque 240. It is noted that this connection between driver demanded braking and the timing of the torque phase occurs in this example coincidentally at the same time as the change in the driver demand. The change in the driver demand does not cause the torque phase to begin. The driver commanded input torque may be increased in response to the wheel braking torque increasing in response to the driver further depressing brake pedal 92. Alternatively or additionally, the magnitude of the driver commanded input torque may be increased with the intention of increasing the regenerative braking (with a corresponding reduction in the friction braking to maintain the desired wheel braking torque) such that more regenerative braking energy is collected as the regenerative braking event progresses.

As shown in FIGS. 2A and 2B, transmission input speed 220 decreases during boost phase 204, start phase 205, and torque phase 206. During inertia phase 208, an increase occurs in transmission input speed 220 as the gear ratios are shifted from higher gear 271 to lower gear 272.

In a conventional control system, when the magnitude of driver commanded input torque 240 is increased in torque phase 206 as shown in FIG. 2A, an increase in regenerative braking torque 230 correspondingly occurs as represented by dotted line 232. Consequently, if the increase is too large over a small period of time, then transmission input speed dipping or slowing effects will, if not compensated for, show up as a dip 222 in transmission input speed 220. This is because the change in regenerative braking torque 230 may be too fast for OGC 73 to hold before OCC 72 is engaged. This dip may be felt as a shift shock.

According to control strategies in accordance with embodiments of the present invention, when the magnitude of driver commanded input torque 240 is increased in torque phase 206 as shown in FIG. 2A, the regenerative braking torque 230 is slowly increased over time until the regenerative braking torque equals the magnitude of the driver commanded input torque (which happens, in this example, in inertia phase 208). Slowly increasing regenerative braking torque 230 results in transmission input speed 220 not having dip 222. Therefore, in accordance with an aspect of the present invention, motor torque signal 98 applied to motor 30 representing the requisite amount of motor torque to be provided by regenerative braking is regulated such that the regenerative braking torque is slowly increased over time, thereby avoiding transmission input speed dipping or stopping effects during a downshift with regenerative braking.

The regenerative braking torque 230 is slowly increased in conjunction with the transmission torque limit 250 being increased as shown in FIG. 2A. As such, the transmission torque limit 250 is used to limit or prevent the regenerative braking torque 230 from increasing too fast.

If the magnitude of the driver commanded input torque 240 was increased in response to an increase in the desired braking, then the controller controls the friction braking system to provide a corresponding increased friction braking torque. In this event, the friction braking torque in lieu of the regenerative braking torque is increased to immediately meet the increase in the desired wheel braking torque. The controller controls motor 30 to slowly increase the regenerative braking torque until the regenerative braking torque by itself accommodates the increase in the desired wheel braking. The controller controls the friction braking system to correspondingly decrease the friction braking torque as the regenerative braking torque is increased such that the wheel braking torque matches the desired wheel braking.

Similarly, if the magnitude of the driver commanded input torque 240 was increased to increase the collected regenerative braking energy as the regenerative braking event progresses over time, then controller controls motor 30 to increase the regenerative braking torque and controls the friction braking system to correspondingly decrease the friction braking torque such that the wheel braking torque matches the desired wheel braking.

In turn, inertia phase 208 begins. In inertia phase 208, the input speed of transmission 50 is pushed higher as transmission 50 downshifts because of the speed ratio increase.

As described, a downshift occurring during a regenerative braking event is a type of shift for the transmission where negative torque is transmitted from the road to the motor during the event. The transmission torque limit is used by the transmission to perform non-regenerative shifts. Control strategies in accordance with embodiments of the present invention extend the application of the transmission torque limit to a downshift occurring during a regenerative braking event. Using the transmission input torque (also called the "slow" torque limit) as described above, the OCC is reasonably guaranteed to hold the input torque across the clutch. By lowering the transmission torque limit at a set rate the amount of regenerative braking energy captured can be increased as the regenerative braking event progresses or as more wheel braking is desired. When using the transmission torque limit the transmission is telling the rest of the system its input torque is limited in some fashion. When using the transmission torque limit, the braking system can "see" the system limitation and fills with friction braking torque to provide the desired wheel braking.

While exemplary embodiments are described above, it is not intended that these embodiments describe all possible forms of the present invention. Rather, the words used in the specification are words of description rather than limitation, and it is understood that various changes may be made without departing from the spirit and scope of the present invention. Additionally, the features of various implementing embodiments may be combined to form further embodiments of the present invention.

What is claimed is:

1. A method comprising:
maintaining an input speed of a transmission linear while the input speed is slowing during a downshift of the transmission by limiting increase of a regenerative braking torque supplied by a motor to the transmission to a rate in which the regenerative braking torque does not cause variations in the input speed when the input speed is slowing as the regenerative braking torque supplied by the motor to the transmission is increased.

2. The method of claim 1 wherein:
the input speed is maintained linear while the input speed is slowing during a torque phase of the downshift.

3. A method for a hybrid vehicle powertrain system including a transmission for driving a drive wheel through multiple gear ratios, the method comprising:
effecting a downshift between the gear ratios during regenerative braking;
measuring a transmission input speed signal indicative of the transmission input speed; and
maintaining the transmission input speed signal substantially linear while the transmission input speed is slowing during the downshift by limiting a rate of increase of a regenerative braking torque supplied by a motor to the transmission to a rate in which the regenerative braking torque does not cause variations in the transmission input speed when the transmission input speed is slowing as the regenerative braking torque supplied by the motor to the transmission is increased.

4. The method of claim 3 further comprising:
sending a motor torque signal to the motor to cause the motor to supply the regenerative braking torque to the transmission;
wherein maintaining the transmission input speed signal substantially linear while the transmission input speed is slowing further includes modulating the motor torque signal to limit the rate of increase of the regenerative braking torque supplied by the motor to the transmission.

5. The method of claim 4 further comprising:
sending a friction brake torque signal to a friction brake to cause the friction brake to generate a friction braking torque;
transferring the friction braking torque to the drive wheel; and
varying the friction brake torque signal as the motor torque signal is modulated such that the friction brake torque signal and the motor torque signal together correspond to a required wheel braking torque signal.

6. The method of claim 4 further comprising:
sending a friction brake torque signal to a friction brake to cause the friction brake to generate a friction braking torque;
transferring the friction braking torque to the drive wheel; and
decreasing the friction brake torque signal as the motor torque signal is increased such that the friction brake torque signal and the motor torque signal together correspond to a required wheel braking torque signal.

7. The method of claim 3 wherein:
the transmission input speed signal is maintained substantially linear while the transmission input speed is slowing during a torque phase of the downshift.

8. A method in a hybrid vehicle powertrain system including an automatic transmission with multiple gear ratios, the method comprising:
effecting a downshift between the gear ratios during regenerative braking; and
maintaining the transmission input speed substantially linear while the transmission input speed is slowing during the downshift by limiting a rate of increase of regenerative braking torque supplied by a motor to the transmission to a rate lower than a rate of increase of a driver command input torque whereby the regenerative braking torque does not cause variations in the transmission input speed when the transmission input speed is slowing as the regenerative braking torque supplied by the motor to the transmission is increased, the driver command input torque being increased in response to either an increase in a desired braking or an attempt to increase collected regenerative braking energy.

9. The method of claim 8 wherein:
the transmission input speed is maintained substantially linear while the transmission input speed is slowing during a torque phase of the downshift.

* * * * *